Patented July 10, 1928.

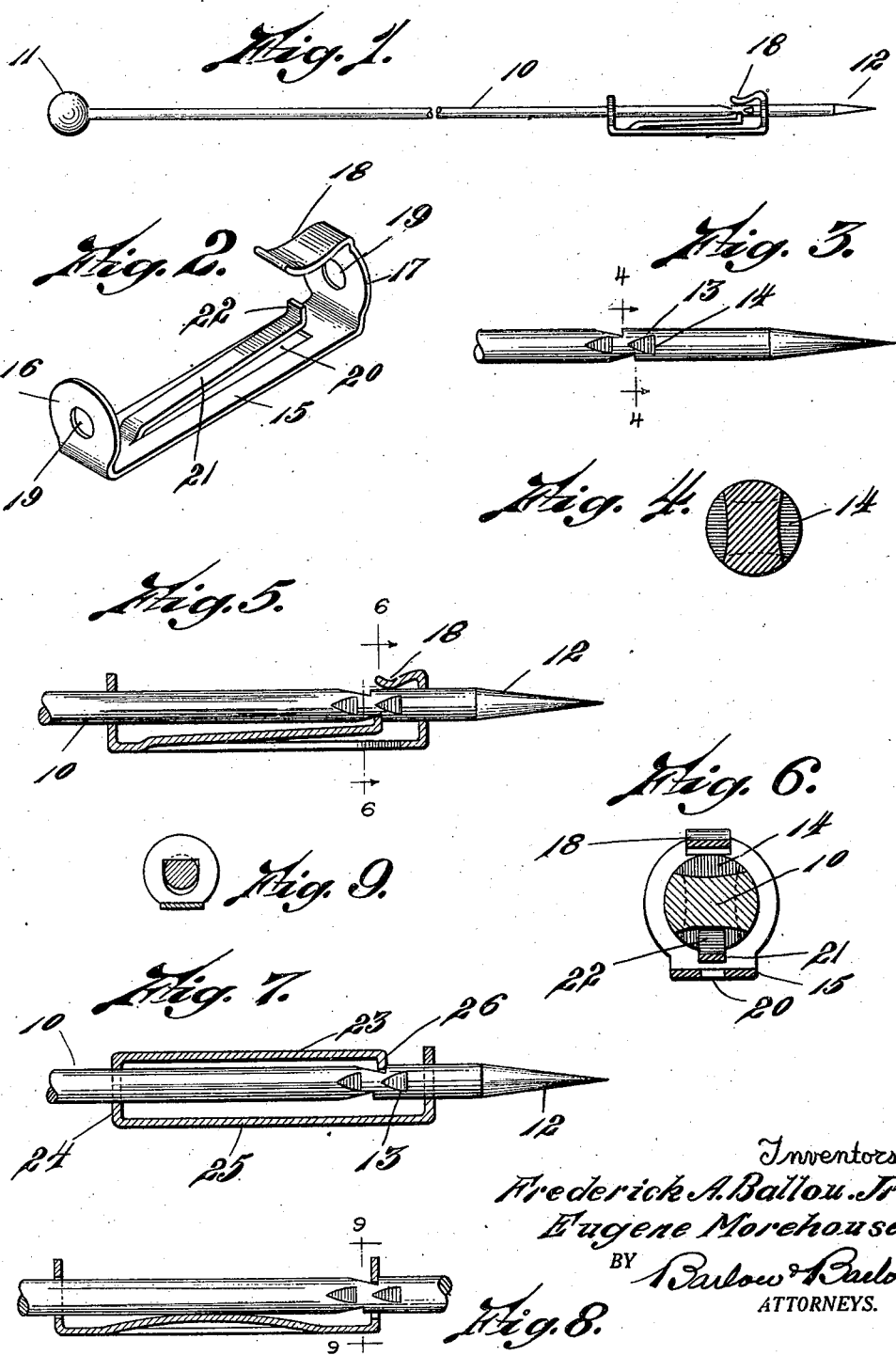

1,676,376

UNITED STATES PATENT OFFICE.

FREDERICK ALLAN BALLOU, JR., AND EUGENE MOREHOUSE, OF PROVIDENCE, RHODE ISLAND, ASSIGNORS TO B. A. BALLOU & CO., INC., OF PROVIDENCE, RHODE ISLAND, A CORPORATION OF RHODE ISLAND.

GUARD FOR STICKPINS.

Application filed November 17, 1927. Serial No. 233,850.

This invention relates to an improved construction of stick pin and guard therefor; and has for its object to provide a pin guard of this character having an abutment arranged to engage in any one of a plurality of notches in the body or shank of the pin irrespective of their relative rotative position of the guard and pin to prevent loss of the pin by inadvertent withdrawal of the guard over the pointed end of the pin.

A further object of the invention is the provision of a stick pin having a shank portion with a plurality of notches staggered about its surface, the guard member having a latch arranged to engage any one of said notches with resilient means for maintaining such engagement and permit the engagement of the latch by a relative axial movement of the guard and permit removal by a relative rotative movement in either direction combined with a withdrawing axial movement.

With these and other objects in view, the invention consists of certain novel features of construction, as will be more fully described, and particularly pointed out in the appended claims.

In the accompanying drawings:

Figure 1 is a view showing a stick pin having a notched shank with our improved guard device releasably attached thereto.

Figure 2 is a perspective view showing one form of guard device removed from the pin.

Figure 3 is a view showing staggered notches or abutments on the shank portion of the pin.

Figure 4 is a greatly enlarged cross sectional view on line 4—4 of Figure 3.

Figure 5 is an enlarged view showing our improved guard in section and attached to the shank of a pin, the latch of the guard engaging one of the notches of the pin shank.

Figure 6 is a sectional end elevation on line 6—6 of Figure 5.

Figure 7 is a modification showing the latch as attached to the body of the guard through one of the end walls thereof.

Figure 8 is another modification illustrating the spring tongue as pressing the notches of the pin stem into engagement with the edge wall of the pierced hole in the upturned end of the body.

Figure 9 is a section on line 9—9 of Fig. 8 showing the shape of the piercings in the end wall.

It is found in practice of advantage to provide a stickpin guard which will positively be prevented from inadvertent removal from the shank of the pin by forming a plurality of notches which are arranged in staggered overlapping relation about the shank of the pin and to provide a latch on the guard adapted to engage some one of the notches by a relative axial movement of the guard and pin irrespective of their relative rotative positions and to be able to release the guard from the pinstem by relative rotation of the guard and pinstem in either direction whereby the guard member may be withdrawn only by a combined rotative and axial movement; and the following is a detailed description of the present embodiment of our invention and showing the preferred arrangement of parts by which these advantageous results may be accomplished:—

With reference to the drawings, 10 designates the shank of a pin which may be provided with an enlargement 11 at one end and a point 12 at its opposite end, the shank portion near the point end being preferably provided with a plurality of notches 13, one end of each notch being preferably set practically at right angles to the axis to form a stop abutment 14 to prevent inadvertent withdrawal of the guard.

A plurality of these abutments may be formed about the surface of the pinstem in staggered overlapping relation, thereby requiring merely an axial movement between the pin and the guard irrespective of their relative rotative positions to permit the latch to engage one of said abutments and requiring a relative rotation of the latch and the pin to cause the latch to ride out of the notch engaged by it up onto an unnotched portion between the notches before the same may be axially withdrawn to the next notch thus requiring a combined rotative and axial movement for complete disengagement.

One form of guard member is best illustrated in Figure 2 and comprises a body portion 15 formed of sheet stock having upturned end walls 16 and 17. The end wall 17 is herein shown as being provided with a finger member 18 which is arranged to overlie and press upon the pin shank when extending through the openings 19 in these end walls.

The body portion 15 of this guard member is preferably slit as at 20 forming a latch member 21 which is raised from the stock of this body, the latch having an inturned engaging abutment end 22 which is arranged to enter any one of the notches 13 in the shank and rest against the abutment end wall 14 thereof.

In some instances, instead of cutting and raising the latch from the body of the stock as above described, we may connect the latch 23 thru the end wall 24 to the body 25, as illustrated in Figure 7, the end 26 of this latch being turned inward to engage any one of the notches 13 in the pin shank 10.

Our improved guard is very simple and practical in construction and is effective in its operation and when used a stick pin shank having staggered overlapping notches therein the guard is locked in position against being inadvertently removed therefrom, and yet may be readily removed upon being rotated on the pin and given an axial movement with reference thereto to permit the latch to be withdrawn therefrom.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. In combination a stick pin having a plurality of staggered notches in its shank, a guard having a body porton with end walls pierced to receive the shank of said pin and an abutment to engage any one of the notches in the pin.

2. In combination with a stick pin having a notched shank a guard having a body portion with end walls pierced to receive the shank of said pin, one of said end walls having an extension arranged to overlie and resiliently engage said pin shank when positioned in the guard, and a retaining spring latch carried by the body to releasably engage a notch in the pin shank on the side of the pin opposite to that of said extension.

3. In combination, a stick pin having a shank with a plurality of abutments staggered about its surface, a guard for said pin having a body portion with end walls pierced to receive said pin shank, and a spring latch connected to the body and arranged to yieldingly engage one of said abutments in the pin, said abutments cooperating to permit the latch to engage the same by a relative axial movement of the pin and guard and permitted to be removed from the pin by a relative rotative movement in either direction combined with a withdrawing movement.

4. In combination, a stick pin having a shank with a plurality of abutments staggered about its surface, a guard for said pin having a body portion with end walls pierced to receive said pin shank, one of said end walls having an extension arranged to overlie and resiliently engage said pin shank when positioned in the guard, a spring latch cut and raised from the stock of the body and arranged to yieldingly engage an abutment in the pin, said abutments cooperating to permit the latch to engage the same by a relative axial movement of the guard and pin and permitted to be removed from the pin by a relative rotative movement in either direction combined with a withdrawing movement.

5. In combination a pin stem guard member having spaced walls with openings to receive the shank of the pin, abutment means on said guard member, a pin stem member having a shank with spaced abutment means about its surface to be engaged by said abutment means on said guard member irrespective of the relative rotative positions of said members, said means cooperating to permit said members to be attached by an axial movement in one direction and disengaged only by a combined axial movement and a relative rotative movement in either direction.

In testimony whereof we affix our signatures.

FREDERICK ALLAN BALLOU, Jr.
EUGENE MOREHOUSE.